Figure 1:
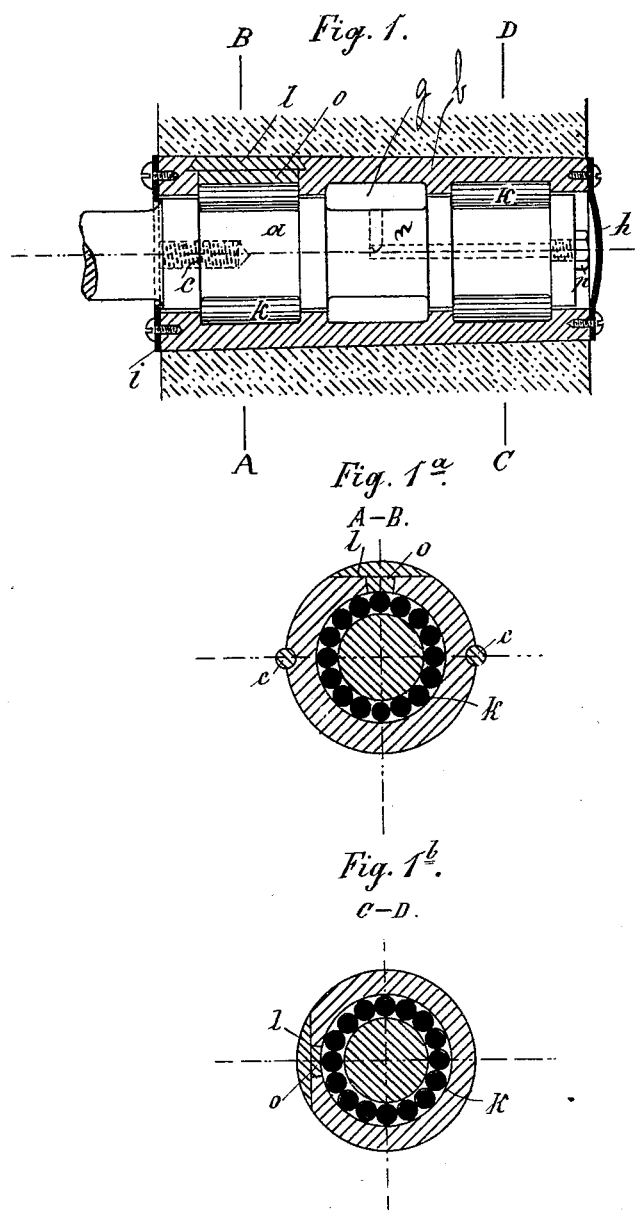

(No Model.) 2 Sheets—Sheet 1.

L. S. VAN SCHAUMBURG.
AXLE BOX.

No. 348,432. Patented Aug. 31, 1886.

Witnesses
William Miller
A Faber du Faur

Inventor
Louis Swaters van Schaumburg
by Van Santvoord & Hauff,
his att'ys

N. PETERS, Photo-Lithographer, Washington, D. C.

(No Model.) 2 Sheets—Sheet 2.
L. S. VAN SCHAUMBURG.
AXLE BOX.
No. 348,432. Patented Aug. 31, 1886.
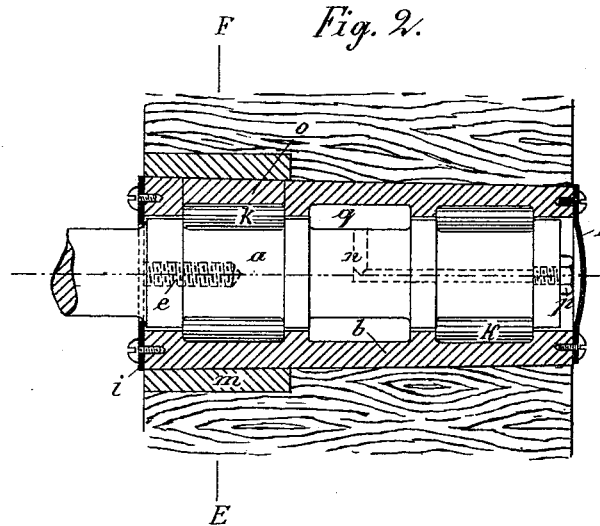
Fig. 2.
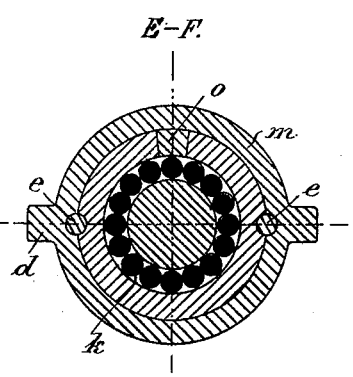
Fig. 2ª.
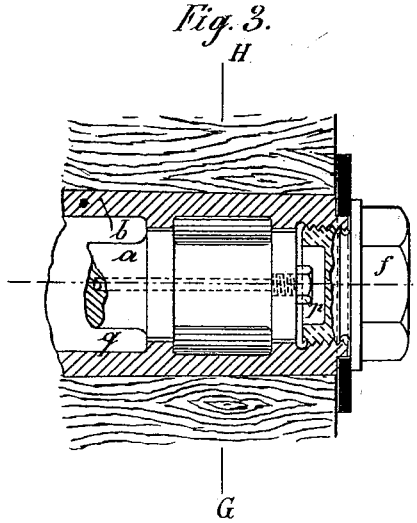
Fig. 3.
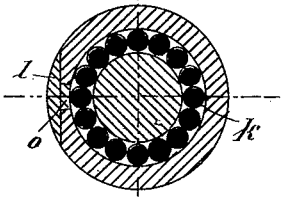
Fig. 3ª.
Witnesses
William Miller
A Faber duFaur
Inventor
Louis Swaters van Schaumburg
by Van Santvoord & Hauff
his att'ys

UNITED STATES PATENT OFFICE.

LOUIS SWATERS VAN SCHAUMBURG, OF BOCHUM, PRUSSIA, ASSIGNOR TO ERNST ROSE, OF HANOVER, PRUSSIA, GERMANY.

AXLE-BOX.

SPECIFICATION forming part of Letters Patent No. 348,432, dated August 31, 1886.

Application filed June 10, 1886. Serial No. 204,766. (No model.)

To all whom it may concern:

Be it known that I, LOUIS SWATERS VAN SCHAUMBURG, a subject of the King of Prussia, residing at Bochum, in the Kingdom of Prussia, Germany, have invented new and useful Improvements in Axle-Boxes, of which the following is a specification.

This invention has for its object to provide a novel axle and wheel-hub for vehicles; and it consists in the features of construction and combination of devices hereinafter described and claimed, reference being made to the accompanying drawings, in which—

Figure 1 represents a longitudinal central section of an axle-box embodying my invention. Fig. 1$^a$ is a transverse section thereof in the plane A B, Fig. 1. Fig. 1$^b$ is a section in the plane C D, Fig. 1. Fig. 2 is a longitudinal central section of a modification. Fig. 2 is a longitudinal central section of a modification. Fig. 2$^a$ is a transverse section thereof in the plane E F, Fig. 2. Fig. 3 is a longitudinal section of another modification. Fig. 3$^a$ is a transverse section in the plane G H, Fig. 3.

Similar letters indicate corresponding parts.

In the drawings, the letter $a$ designates the axle, which is annularly recessed at the proper intervals to receive shaftless rolls $k$, that are fitted in circular recesses in a bush, $b$, which consists of one piece of metal. This bush $b$ is rigidly secured to the hub of the wheel, and as shown in Figs. 1 and 1$^a$, by means of screws $c$, which are screwed up so as to lie both in the hub and in the bush, whereby these parts are very securely held. As shown in Figs. 2 and 2$^a$, the bush is secured to the hub by the projecting lugs $d$ of a ring, $m$, which ring is attached to the bush by screws $e$, as before; or, as shown in Fig. 3, they may be joined very securely by means of a screw, $f$, which is screwed up in the bush and prevented from working loose by an interposed washer which is fitted in a square hole of the bush.

To prevent dust and dirt from entering the bush, plates $h$ $i$ are secured by screws over its two ends, one plate being open to receive the axle.

To insert the shaftless rolls $k$ into the bush, I provide openings $o$, which are subsequently closed by conical plugs provided with dovetail slides $l$, Figs. 1, 1$^a$, and 1$^b$, or by the ring $m$, previously described, Figs. 2 and 2$^a$. The rollers $k$ are properly designed to entirely fill up the circular recesses in the bush $b$, so that the axle is entirely surrounded by and supported upon these circular series of rollers, and consequently very little friction is produced, since the rollers are shaftless. The end walls of the annular recesses in the axle and in the bush serve to prevent longitudinal displacement of the rolls, since portions of each end of the rolls bear, respectively, against the end walls formed by the annular recesses in the axle and the bush. By this means I avoid using cage-rings in which the ends of the rollers are journaled.

To lubricate the rollers and the axle both the axle and bush have a circular recess intermediate of the two sets of rollers $k$, which recesses form an annular lubricating-chamber, into which a solid lubricant is pressed through a hole or channel, $n$, extending from the end of the axle and into the lubricating-chamber. This feed hole or channel can be closed by a plug or screw, $p$, screwed in the end of the axle. The lubricating-chamber communicates with both sets of rollers through annular spaces between the axle and the bush, which are formed by making the diameter of the same smaller at these points than the internal diameter of the bush, so that the lubricant can readily flow to the rollers.

The object of my invention is to do away with the use of washers, screw-plugs, and nuts and the caps and linchpins commonly employed in the construction of axle - boxes, which have proved very unreliable.

Heretofore a metallic hub has been provided with internal flanges containing between them a series of rollers separately journaled at their ends to cage-rings, the axle bearing only on the rollers. Such construction does not constitute my invention, and is not claimed by me.

What I claim as new, and desire to secure by Letters Patent, is—

1. The combination, with a wheel-hub, of a bushing, $b$, inserted and held therein, and provided adjacent to each end with a circular recess, and intermediate said recesses having the annular lubricating-chamber $g$, the axle $a$, having adjacent to each end an annular recess, and provided with the lubricating-channel $n$, extending through the axle from its outer end and in communication with the intermediate lubricating-chamber, said chamber being also in communication with the respective recesses in the axle and hub, and a series of shaftless rolls arranged in the recesses of the bush and axle at opposite ends of the lubricating-chamber and lubricated therefrom, substantially as described.

2. The bushing $b$, having the openings $o$, and provided adjacent to each end with an internal annular recess, with a lubricating-chamber, $g$, intermediate said recesses, the axle $a$, annularly recessed adjacent to each end, and having the longitudinal channel $n$ in communication with the said intermediate lubricating-chamber, and shaftless rolls $k$, arranged in the recesses of the axle and bush, said lubricating-chamber being in communication with the respective recesses in the axle and bush to lubricate the rolls, substantially as and for the purposes described.

In testimony whereof I have signed my name to this specification in the presence of two subscribing witnesses.

LOUIS SWATERS VAN SCHAUMBURG.

Witnesses:
M. G. AMMERSBAD,
F. J. FALKENBACK.